June 24, 1930.     S. A. BEYLAND     1,766,370
PROCESS OF MANUFACTURING CAPACITORS
Filed June 20, 1927
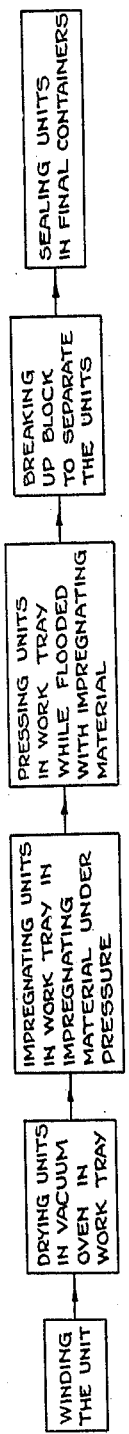
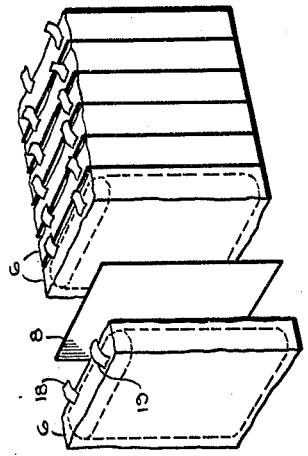
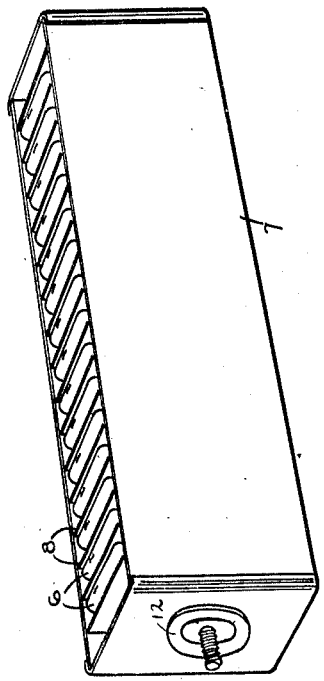
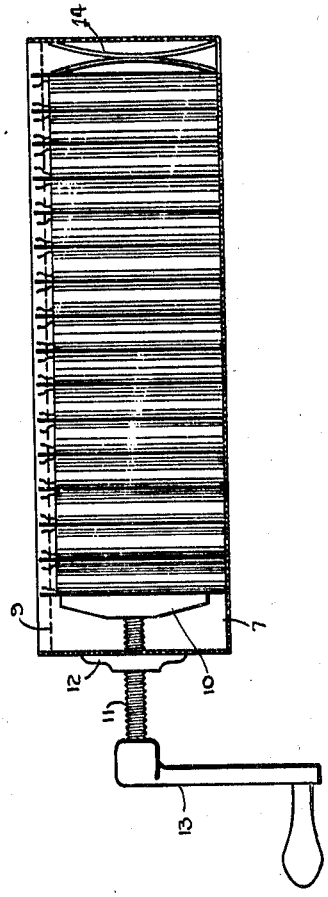
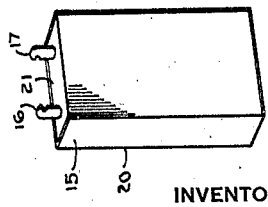
INVENTOR
SYDNEY A. BEYLAND
BY
ATTORNEY Patented June 24, 1930

1,766,370

UNITED STATES PATENT OFFICE

SIDNEY A. BEYLAND, OF ROCHESTER, NEW YORK, ASSIGNOR TO THE STROMBERG-CARLSON TELEPHONE MANUFACTURING COMPANY, OF ROCHESTER, NEW YORK, A CORPORATION OF NEW YORK

PROCESS OF MANUFACTURING CAPACITORS

Application filed June 20, 1927. Serial No. 200,279.

This invention relates to capacitors and more particularly to the process of manufacturing fixed capacitors.

In so far as applicant is aware three methods are employed in the manufacture of paper condensers or capacitors. In one of these methods the capacitors are formed of paper and conducting foil on a winding machine after which they are transferred to a drying oven of the vacuum type which functions to eliminate moisture. After drying the capacitor units are transferred to an impregnating tank where they are treated with impregnating material such as wax under pressure and when the units have been subjected to this impregnating material for a predetermined period the impregnating material in the tank is cooled until it has reached a plastic condition at which time the units are removed from the tank and stacked in a press preferably of the hydraulic type. In this process the ends of the capacitor units are exposed while the units are being compressed and since it is necessary to remove the units from the tank while the material is in a plastic condition an excessive amount of material flows out of the units which is commonly referred to in the art as "bleeding." This "bleeding" exposes the ends of the units so that moisture enters the windings resulting in defective units.

In another process that has been employed the units when wound on a machine are mounted in their final containers usually of thin sheet metal after which the units and final containers are submerged in a tank of impregnating material and when the units and their containers are removed from the tank they are compressed to substantially their final dimensions. The principal objection to this process is that a much larger amount of dielectric and conducting material is necessary for a given capacitance than with the former method and in addition to this waste of material the capacitors are more bulky than those of the first mentioned type. Furthermore these capacitors frequently have voids or air spaces due to the fact that the capacitors cannot be pressed to such small dimensions in the final container as they can be in the case of the first mentioned process.

A third process that has been employed consists in forming the capacitor units and pressing them to their final dimensions by a clamp that forms a part of the finished capacitor after which the units are dried and impregnated. In the smaller sizes of capacitors it is undesirable to have a clamp as a part of the finished product since it increases the cost of manufacturing and also increases the sizes of each unit.

In accordance with the present invention it is proposed to employ a process of manufacturing capacitor units in which the handling of these units is reduced to a minimum and wherein bleeding as well as variations in resistance and capacitance are negligible.

The main feature of this invention resides in the process of manufacturing capacitor units which consists is pressing a series of unmounted capacitor units to final dimensions while flooded with an excess of impregnating material.

Another feature of the invention consists in designing a work tray or cage of such design that the units may remain in the cage during the various steps of drying, impregnating and pressing, the dimensions of the tray being such that a surplus of impregnating material is maintained around all sides of each unit while it is under pressure until the impregnating material has cooled to substantially ambient or room temperatures at which temperature it has solidified.

Another feature of the invention consists in pressing the units to substantially final dimensions under compensating pressure while they are surrounded on all sides by an excess of impregnating material.

For a clearer understanding of the invention reference is made to the drawings in which Fig. 1 is a schematic diagram of the more important steps of the process. Fig. 2 is a perspective view of a combined press and work tray loaded with units and Fig. 3 is a side view of the work tray of Fig. 2 with the front side cut away. Fig. 4 is a block or group of capacitor units in the solidified impregnating material with one individual unit broken away from the block to show more clearly the excess of impregnating material and the use of a metal plate as a separator while Fig. 5 shows a perspective view of a finished capacitor after the unit has been mounted and sealed in its final container.

In following the present process the capacitor units such as 6 are formed of two or more sheets of conducting material and four or more sheets of dielectric material wound in the well-known manner on any suitable type of winding machine. After each unit is wound it is placed in a container or work tray 7 which is of substantially the same width as the units but of slightly greater depth than the length of the units. In order to separate the units from each other and to facilitate the breaking up of a group or block of units into individual units as shown in Fig. 4 thin metal plates or separators 8 are placed one between each adjacent pair of units. The width of these separators may be substantially equal to the inside width of the work tray 8 but in length are considerably longer than the longest dimension of the units as is more clearly shown in Fig. 3. When the work tray 7 is loaded with units separated by the metal spacers 8, the tray is placed in a vacuum oven of any well-known type wherein it is subjected to heat and vacuum to eliminate all moisture. Thereafter the tray still containing the units is transferred to an impregnating tank wherein they are submerged in impregnating material under pressure which impregnating material has previously been subjected to vacuum and other treatment to remove moisture and other impurities. When the units have thus been thoroughly impregnated the work tray 7 still containing the units is removed from the impregnating tank with a surplus of impregnating material in the work tray up to a level designated 9 so that the units 8 are flooded with a surplus of impregnating material. The units are now in condition to be compressed to their final dimensions and for this purpose any suitable press may be employed which permits compressing the units while they are still retained in the work tray. For purposes of this description this compression is shown in Fig. 3 as being accomplished by means of a follower block 10 driven by a screw 11 threaded in a block 12 attached to the end of the work tray. A detachable crank 13 permits adjustment of the screw 11 so that a predetermined amount of pressure may be applied to the group or block of capacitor units. It has been found that the impregnating material in cooling contracts and unless some means is provided the pressure on the block of capacitor units diminishes as the cooling progresses. In order to provide substantially uniform pressure on the block of condensers during the whole period of cooling a spring 14 is included between the end of the work tray and the block of capacitor units so that as the impregnating material contracts the spring 14 increases or compensates the pressure. In this way there is no diminution in pressure with the desirable result that air spaces in the winding of the units are almost entirely eliminated.

After cooling the screw 11 and follower block 10 are released and the block of capacitors shown in Fig. 4 are removed from the work tray. It is then necessary to separate the individual capacitor units 6 from the block and the spacer or separator plates 8 permit this step in the process to be easily accomplished. It will be noted that there is an excess of impregnating material attached to each capacitor unit especially at the top and at the two sides. This excess material is easily broken off after which terminals 16 and 17 are connected to the strips 18 and 19 which have been attached to the sheets of foil during winding. The individual unit is then placed in a metal container 20 which may be sealed by any suitable waterproof material.

The foregoing process has shown a marked improvement over former processes in that it has materially reduced the number of defective units and has permitted the production of units with higher resistance and higher capacitance than that of capacitor units manufactured under other known processes.

What I claim is:

1. The process of manufacturing capacitor units which consists in forming the unmounted capacitor units, drying the units thus formed to eliminate moisture, impregnating the unmounted units in a bath of impregnating material, removing the units from the bath of impregnating material, then pressing them to their final dimensions while flooded with an excess of impregnating material in a temporary liquid-retaining receptacle, and placing the units in containers.

2. The process of manufacturing capacitors which consists in forming unmounted units, drying the units to remove moisture, impregnating the units, pressing the units in a bath of impregnating material outside of said bath while surrounded by an excess of impregnating material in a temporary liquid-retaining receptacle, cooling the impregnating material around said units to ambient temperature while the units are retained under compensated presssure to final dimensions, removing the excess impregnating material, and sealing the units in their final containers.

3. The process of manufacturing capacitors which consists in forming unmounted capacitor units, drying the units to remove moisture, impregnating the units in a bath of impregnating material, pressing the units in a group in a temporary liquid-retaining receptacle outside of said bath while submerged in impregnating material at a substantially predetermined fixed compensated pressure until the impregnating material has solidified, removing the units from the group, and mounting the individual units in containers.

4. The process of preparing unmounted capacitor units which consists in forming each unit of conducting material separated by sheets of dielectric, placing the unmounted units in a work tray of greater depth than the capacitor units and of such construction that it will retain the impregnating material, placing a thin separator between adjacent units, drying the unmounted units in the work tray until the major portion of the moisture is eliminated, submerging the work tray and unmounted units in impregnating material, removing the work tray from the impregnating material with a surplus amount of impregnating material covering said units, and pressing the unmounted units in the work tray to their final dimensions while surrounded by a surplus amount of impregnating material.

5. The process of forming capacitor units which consists in winding the units of sheets of conducting material and sheets of dielectric material, placing the units thus formed in a work tray open only at its top and of such depth as to completely contain the capacitor units, separating each unit from an adjacent unit by a thin plate of metal of substantially the same width as a unit, drying the capacitor units thus assembled in the work tray under vacuum and heat, immersing the dried capacitor units and work tray in impregnating material until the units are impregnated, removing the work tray and the unmounted capacitor units from the impregnating material before it has cooled beyond its plastic state, pressing the unmounted capacitor units to their final dimensions in the work tray under a surplus of impregnating material, cooling the units until the impregnating material is solid, breaking up the block of unmounted capacitor units thus formed by the cooling of the impregnating material, and removing any excess impregnating material.

6. The process of forming capacitor units which consists in winding the units of sheets of conducting material and sheets of dielectric material, placing the units thus formed in a work tray open only at its top and of such depth as to completely contain the capacitor units, separating each unit from an adjacent unit by thin plates of metal substantially the same width as a unit but greater in length than the length of a capacitor unit, drying the capacitor units thus assembled in the work tray under heat and vacuum, immersing the dried capacitor units and work tray in impregnating material under pressure until the units are impregnated, removing the work tray and the unmounted capacitor units from the impregnating material before it has cooled beyond its plastic state, pressing the unmounted capacitor units to their final dimensions under compensating pressure in said work tray to compensate for the shrinkage of the impregnating material during cooling, cooling the capacitor units while retained under compensating pressure to ambient temperature, separating the units from the block thus formed, and removing excess impregnating material.

7. The process of preparing capacitor units which consists in forming each unit of conducting material and dielectric, placing the unmounted units vertically in a work tray of greater depth than the capacitor units, inserting a thin separator of greater length than the units between adjacent units, drying the unmounted units in the work tray to eliminate moisture, submerging the work tray and unmounted units in impregnating material until thoroughly impregnated, removing the work tray from the impregnating material, pressing the unmounted units in the work tray to their final dimensions while surrounded by a surplus amount of impregnating material until the impregnating material is thoroughly cooled, removing the block of units thus formed from said work tray, breaking up said block into individual units to remove said separators, removing excess impregnating material from each unit, and mounting each unit in a sealed container.

In witness whereof, I hereunto subscribe my name this 14th day of June, A. D. 1927.

SIDNEY A. BEYLAND.

CERTIFICATE OF CORRECTION.

Patent No. 1,766,370.                                Granted June 24, 1930, to

SIDNEY A. BEYLAND.

It is hereby certified that error appears in the printed specification of the above numbered patent requiring correction as follows: Page 2, line 121, claim 2, strike out the words "in a bath of impregnating material" and insert the same to follow after the word "units" in line 120; and that the said Letters Patent should be read with this correction therein that the same may conform to the record of the case in the Patent Office.

Signed and sealed this 19th day of August, A. D. 1930.

(Seal)                                                         M. J. Moore,
                                                              Acting Commissioner of Patents.